(12) United States Patent
Horiuchi et al.

(10) Patent No.: US 11,452,095 B2
(45) Date of Patent: *Sep. 20, 2022

(54) TERMINAL AND COMMUNICATION METHOD

(71) Applicant: Panasonic Intellectual Property Corporation of America, Torrance, CA (US)

(72) Inventors: Ayako Horiuchi, Kanagawa (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/103,563

(22) Filed: Nov. 24, 2020

(65) Prior Publication Data

US 2021/0076377 A1  Mar. 11, 2021

Related U.S. Application Data

(63) Continuation of application No. 16/321,316, filed as application No. PCT/JP2017/025688 on Jul. 14, 2017, now Pat. No. 10,880,885.

(30) Foreign Application Priority Data

Aug. 10, 2016  (JP) .............................. JP2016-157954

(51) Int. Cl.
*H04W 72/04*  (2009.01)
*H04W 52/34*  (2009.01)
(Continued)

(52) U.S. Cl.
CPC ..... *H04W 72/0446* (2013.01); *H04W 52/281* (2013.01); *H04W 52/34* (2013.01); *H04W 72/04* (2013.01); *H04W 72/1284* (2013.01)

(58) Field of Classification Search
CPC ... H04W 52/281; H04W 52/34; H04W 72/04; H04W 72/0446; H04W 72/1284
(Continued)

(56) References Cited

U.S. PATENT DOCUMENTS

2016/0255594 A1* 9/2016 Vajapeyam ......... H04W 52/346
455/522
2016/0323887 A1* 11/2016 Patel ................... H04W 52/365
(Continued)

OTHER PUBLICATIONS

International Search Report of PCT application No. PCT/JP2017/025688 dated Sep. 12, 2017.
(Continued)

*Primary Examiner* — Robert J Lopata
(74) *Attorney, Agent, or Firm* — Seed IP Law Group LLP

(57) ABSTRACT

A DCI receiving unit receives downlink control information (DCI) indicative of allocation of an uplink (UL) signal of a first TTI (long TTI) or an uplink signal of a second TTI (sTTI) having a shorter TTI length than the first TTI; a transmission power determination unit determines transmission power of the uplink signal of the first TTI and transmission power of the uplink signal of the second TTI; and a transmitting unit transmits the uplink signal of the first TTI and the uplink signal of the second TTI by using the determined transmission power on the basis of the downlink control information. The transmission power determination unit reserves desired transmission power for the uplink signal of the second TTI in the first TTI in a case where decoding of the downlink control information indicative of allocation of the uplink signal of the second TTI to be transmitted within the first TTI (e.g., a subframe) is completed before start of transmission of the uplink signal of the first TTI.

12 Claims, 10 Drawing Sheets

(51) Int. Cl.
*H04W 52/28* (2009.01)
*H04W 72/12* (2009.01)

(58) Field of Classification Search
USPC .......................................................... 370/336
See application file for complete search history.

(56) References Cited

U.S. PATENT DOCUMENTS

| | | | |
|---|---|---|---|
| 2017/0013565 A1* | 1/2017 | Pelletier | H04W 52/365 |
| 2017/0273071 A1* | 9/2017 | Nogami | H04W 72/1242 |
| 2017/0325257 A1* | 11/2017 | Liu | H04L 5/0053 |
| 2018/0049206 A1* | 2/2018 | Yerramalli | H04W 52/38 |
| 2018/0110062 A1* | 4/2018 | Byun | H04W 72/14 |
| 2018/0176938 A1* | 6/2018 | Shao | H04W 52/346 |
| 2019/0098622 A1* | 3/2019 | Lee | H04W 72/0446 |
| 2019/0116559 A1* | 4/2019 | Takeda | H04W 52/367 |
| 2019/0159138 A1* | 5/2019 | Lee | H04W 52/146 |
| 2019/0159144 A1* | 5/2019 | Zhang | H04W 52/325 |
| 2019/0174430 A1* | 6/2019 | Gao | H04W 52/48 |
| 2019/0230600 A1* | 7/2019 | Gao | H04W 72/0446 |
| 2021/0021454 A1* | 1/2021 | Horiuchi | H04W 52/346 |

OTHER PUBLICATIONS

3GPP TSG RAN WG1 Meeting #85, R1-164923, "Simultaneous Transmissions of UL Signals for Shortened TTI Operation", May 2016.

3GPP TSG RAN Meeting #67, RP-150465, "New SI proposal: Study on Latency reduction techniques for LTE", Mar. 2015.

3GPP TS 36.211 V13.0.0, "$3^{rd}$ Generation Partnership Project; Technical Specification Group Radio Access Network; Evolved Universal Terrestrial Radio Access (E-UTRA); Physical channels and modulation (Release 13)", Dec. 2015.

3GPP TSG-RAN WG1 #85, R1-165294, "PCI for sTTI scheduling", May 2016.

3GPP TSG RAN WG1 Meeting #86, R1-166968, "UL simultaneous transmission between sTTI and TTI", Aug. 2016.

English Translation of Chinese Search Report dated Jan. 5, 2021 for the related Chinese Patent Application No. 201780045065.X, 4 pages.

InterDigital, "Consideration on sPUSCH Design," R1-165052, Agenda Item: 6.2.10.1, 3GPP TSG RAN WG1 Meeting #85, Nanjing, China, May 23-27, 2016, 3 pages.

* cited by examiner

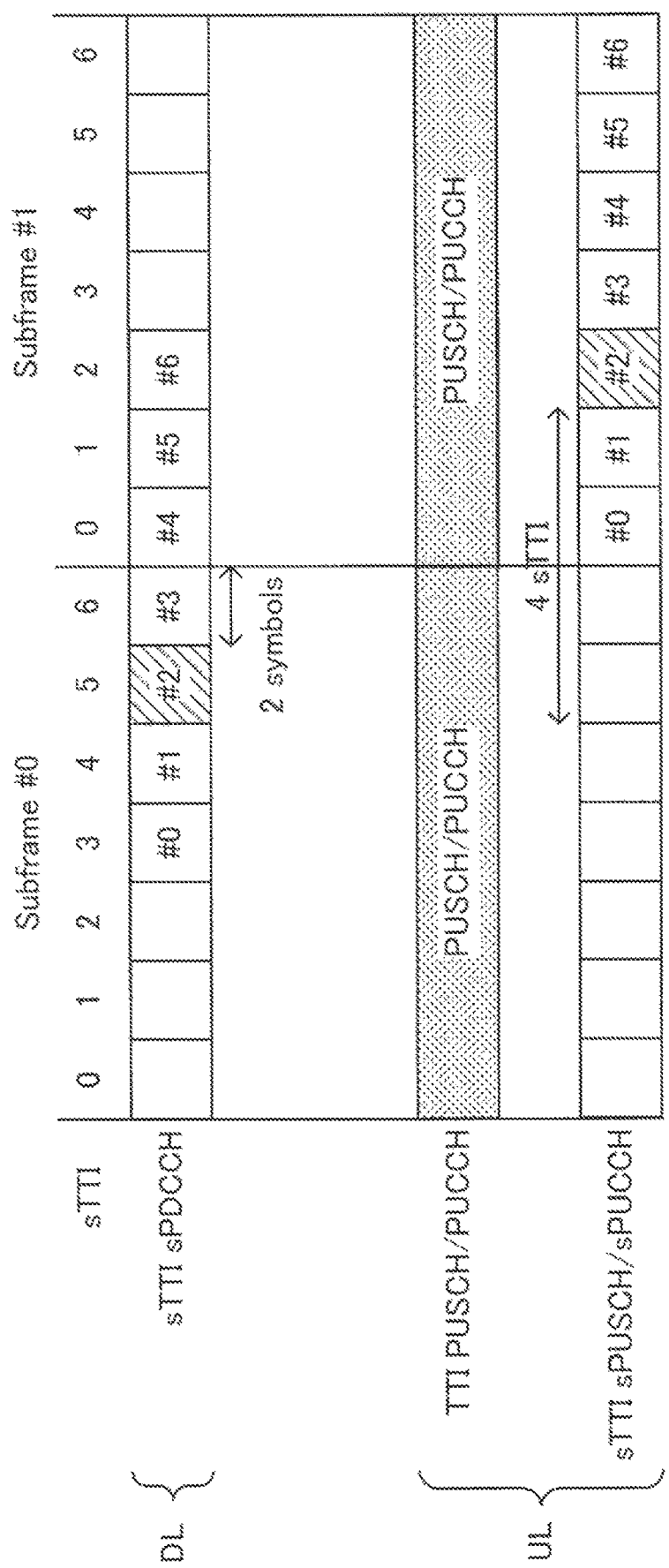

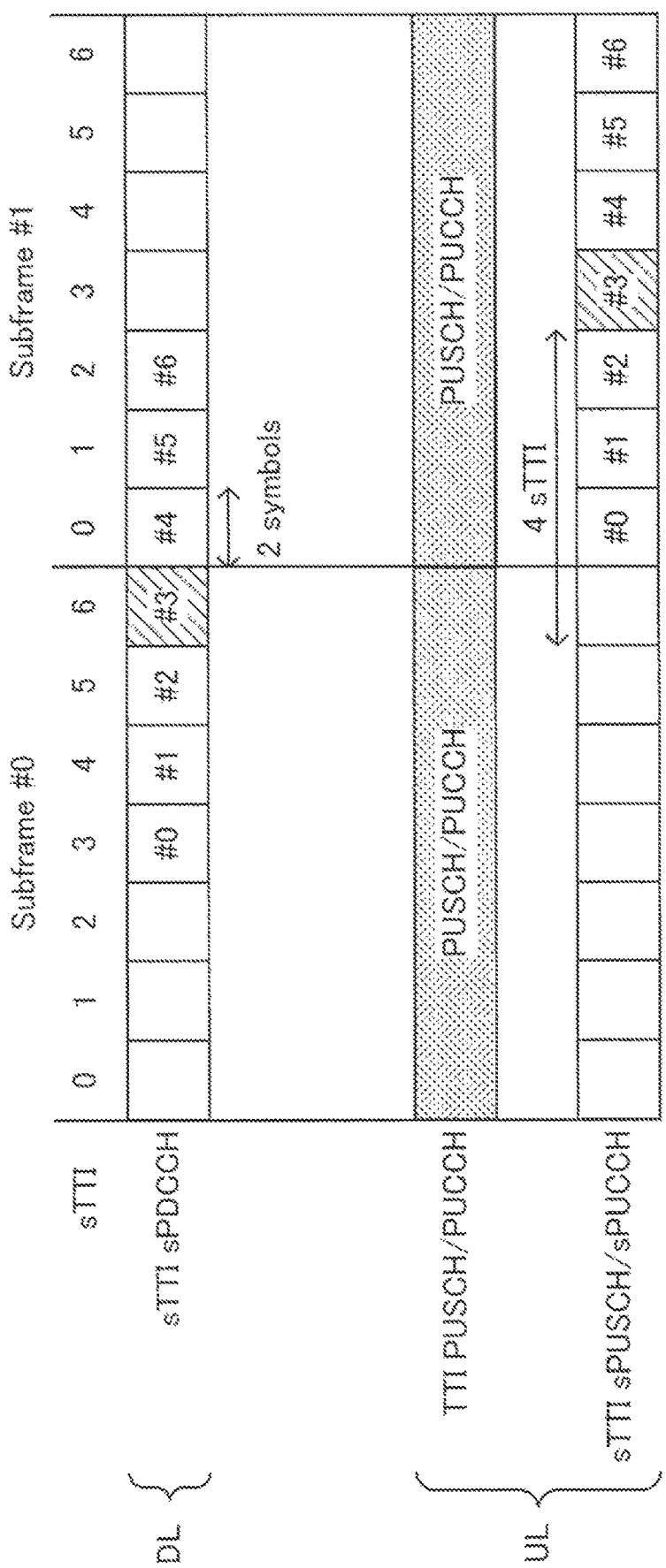

TERMINAL AND COMMUNICATION METHOD

TECHNICAL FIELD

The present disclosure relates to a terminal and a communication method.

BACKGROUND ART

In recent years, realization of an application (a delay-critical application) that is required to shorten a delay time is being considered. Examples of such an application that is required to shorten a delay time include an application for autonomous driving, a super-reality application for smart-glasses, and an application for communication between apparatuses.

In the 3GPP, latency reduction for reducing packet delay is being considered in order to realize such applications (see Non Patent Literature 1). In the latency reduction, it is being considered that a length of a transmission time interval (TTI), which is a time unit for data transmission and reception, is shortened to a length ranging from 0.5 msec to 1 symbol. A conventional TTI length is 1 msec, which is equal to a unit called a subframe. A single subframe is constituted by 2 slots (1 slot is 0.5 msec). A single slot is constituted by 7 symbols in the case of normal cyclic prefix (CP) and is constituted by 6 symbols in the case of extended CP. For example, in a case where the shortened TTI length is 0.5 msec, 2 TTIs are provided per msec. In a case where 1 slot is divided into a TTI of 4 symbols and a TTI of 3 symbols, 4 TTIs are provided per msec. In a case where a TTI length is 2 symbols, 7 TTIs are provided per msec.

Shortening a TTI length can reduce delay of a channel quality indicator (CQI) report, thereby increasing frequency of a CQI report. This produces an advantage of reducing a difference between a CQI report and actual line quality.

CITATION LIST

Non Patent Literature

Non Patent Literature 1: RP-150465, "New SI proposal: Study on Latency reduction techniques for LTE," Ericsson, Huawei, March 2015

Non Patent Literature 2: 3GPP TR 36.211 V13.0.0, "Physical channels and modulation (Release 13)," December 2015

Non Patent Literature 3: R1-164923, "Simultaneous Transmission of UL Signals for Shortened TTI Operation," Nokia, Alcatel-Lucent Shanghai Bell, May 2016

SUMMARY OF INVENTION

For example, shortening of a TTI length can be applied not only to an enhanced Long Term Evolution (LTE) system, but also to a system realized by a new frame format called a new radio access technology (RAT). In the New RAT, there is a possibility that the number of symbols per msec is different from that in the LTE. In a shortened TTI (hereinafter referred to as a short TTI (sTTI)) operation, plural TTI lengths may be supported simultaneously (see, for example, Non Patent Literature 3). In a case where plural TTI lengths are supported, TTI lengths can be selected and used in accordance with requests from different applications. For example, a long TTI can be used for a packet that permits delay, and an sTTI can be used for a packet that is strict with delay.

However, in a case where maximum transmission power that can be used for a terminal (sometimes referred to as a UE) is not sufficient, simultaneous transmission of packets using plural TTIs having different TTI lengths undesirably causes shortage of transmission power. It is therefore necessary to consider how transmission power is distributed in a case where TTI lengths are different.

An aspect of the present disclosure provides a terminal and a communication method that can properly set how transmission power is distributed in a case where TTI lengths are different.

A terminal according to an aspect of the present disclosure includes a receiving unit that receives downlink control information indicative of allocation of an uplink signal of a first transmission time interval (TTI) or an uplink signal of a second TTI having a shorter TTI length than the first TTI; a transmission power determination unit that determines transmission power of the uplink signal of the first TTI and transmission power of the uplink signal of the second TTI; and a transmitting unit that transmits the uplink signal of the first TTI and the uplink signal of the second TTI by using the determined transmission power on a basis of the downlink control information, wherein the transmission power determination unit reserves desired transmission power for the uplink signal of the second TTI in the first TTI in a case where decoding of the downlink control information indicative of allocation of the uplink signal of the second TTI to be transmitted within the first TTI is completed before start of transmission of the uplink signal of the first TTI.

It should be noted that general or specific embodiments may be implemented as a system, a device, a method, an integrated circuit, a computer program, a storage medium, or any selective combination thereof.

According to an aspect of the present disclosure, it is possible to properly set distribution of transmission power in a case where TTI lengths are different.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 4A illustrates an example of a transmission timing according to Operation Example 1 of Embodiment 1.

FIG. 5A illustrates an example of a transmission timing according to Operation Example 1 of Embodiment 1.

DESCRIPTION OF EMBODIMENTS

Figure 1:
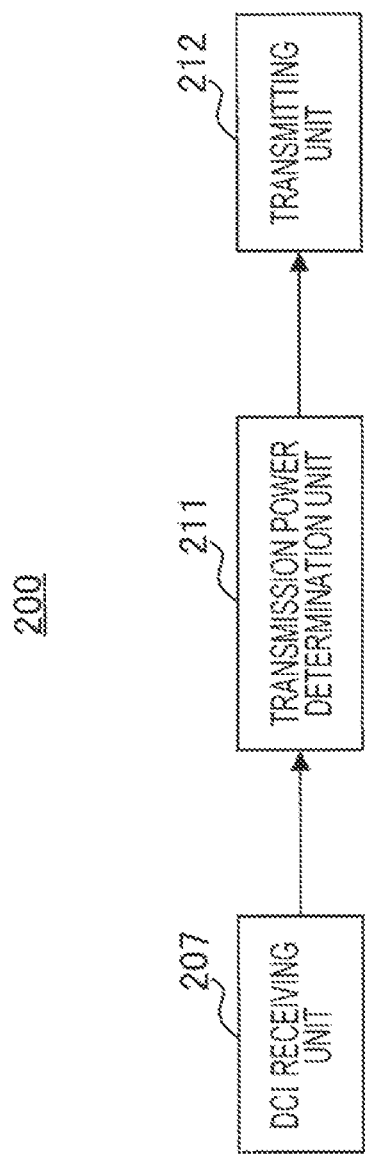
FIG. 1 is a block diagram illustrating a configuration of a substantial part of a terminal according to Embodiment 1.

[Background Leading to Aspect of Present Disclosure]

The background leading to an aspect of the present disclosure is described below.

[Operation of Dual Connectivity]

In dual connectivity, a terminal can transmit an uplink (UL) signal simultaneously in a plurality of cells. Each of the cells belongs to a master cell group (MCG) or a secondary cell group (SCG), and transmission power can be distributed by determining priorities for UL transmission of the MCG and UL transmission of the SCG.

In dual connectivity, minimum guaranteed power is allocated to each CG as power distribution in UL transmission. In a case where a terminal uses transmission power equal to or larger than the minimum guaranteed power, the terminal can use remaining transmission power (remaining power) in accordance with a priority. In a method for power distribution applied in a case where the MCG and the SCG are not synchronized, transmission power of a signal whose transmission starts earlier is not changed.

[Premise]

As for power distribution among TTIs in a case where plural TTI lengths are supported simultaneously, minimum guaranteed power may be allocated to each TTI while regarding a TTI as a cell group as in the case of dual connectivity. For example, in a case where transmission power equal to or larger than the minimum guaranteed power is needed in each TTI, remaining power may be distributed in accordance with priorities or remaining power may be allocated to a signal of a TTI whose transmission starts earlier.

[Problem]

In a case where UL signals of plural TTIs having different TTI lengths are transmitted simultaneously, there is a possibility that a UL signal of an sTTI is allocated and transmission of the UL signal of the sTTI starts after start of transmission of a UL signal of a long TTI. In such a case, shortage of power allocated to the UL signal of the sTTI undesirably occurs in a case where remaining power is small since power has been already allocated to the UL signal of the long TTI even if the priority of the UL signal of the sTTI is higher than the priority of the UL signal of the long TTI.

One measure to give a priority to an sTTI is to always reserve guaranteed power for the sTTI. In this case, however, there is a problem that power allocated to a TTI is always small even in a case where there is no UL allocation of the sTTI. Furthermore, according to a method in which priorities are not determined in accordance with TTI lengths and a UL signal whose transmission starts earlier uses remaining power, unbalance occurs, specifically, a longer TTI more frequently uses remaining power than an sTTI.

In view of the circumstances, an object of an aspect of the present disclosure is to properly distribute power in a case where UL signals of different TTI lengths are transmitted.

Next, embodiments of the present disclosure are described in detail below with reference to the drawings.

Embodiment 1

[Outline of Communication System]

A communication system according to each embodiment of the present disclosure includes a base station 100 and a terminal 200.

FIG. 1 is a block diagram illustrating a configuration of a substantial part of the terminal 200 according to the embodiment of the present disclosure. In the terminal 200 illustrated in FIG. 1, a DCI receiving unit 207 receives downlink control information (DCI) indicative of allocation of an uplink (UL) signal of a first TTI (a long TTI) and an uplink signal of a second TTI (sTTI) having a shorter TTI length than the first TTI; a transmission power determination unit 211 determines transmission power for the uplink signal of the first TTI and transmission power for the uplink signal of the second TTI; and a transmitting unit 212 transmits the uplink signal of the first TTI and the uplink signal of the second TTI with the determined transmission power on the basis of the downlink control information. In a case where decoding of downlink control information indicative of allocation of the uplink signal of the second TTI to be transmitted within the first TTI (e.g., a subframe) is completed before start of transmission of the uplink signal of the first TTI, the transmission power determination unit 211 reserves desired transmission power for the uplink signal of the second TTI in the first TTI.

[Configuration of Base Station]

Figure 2:
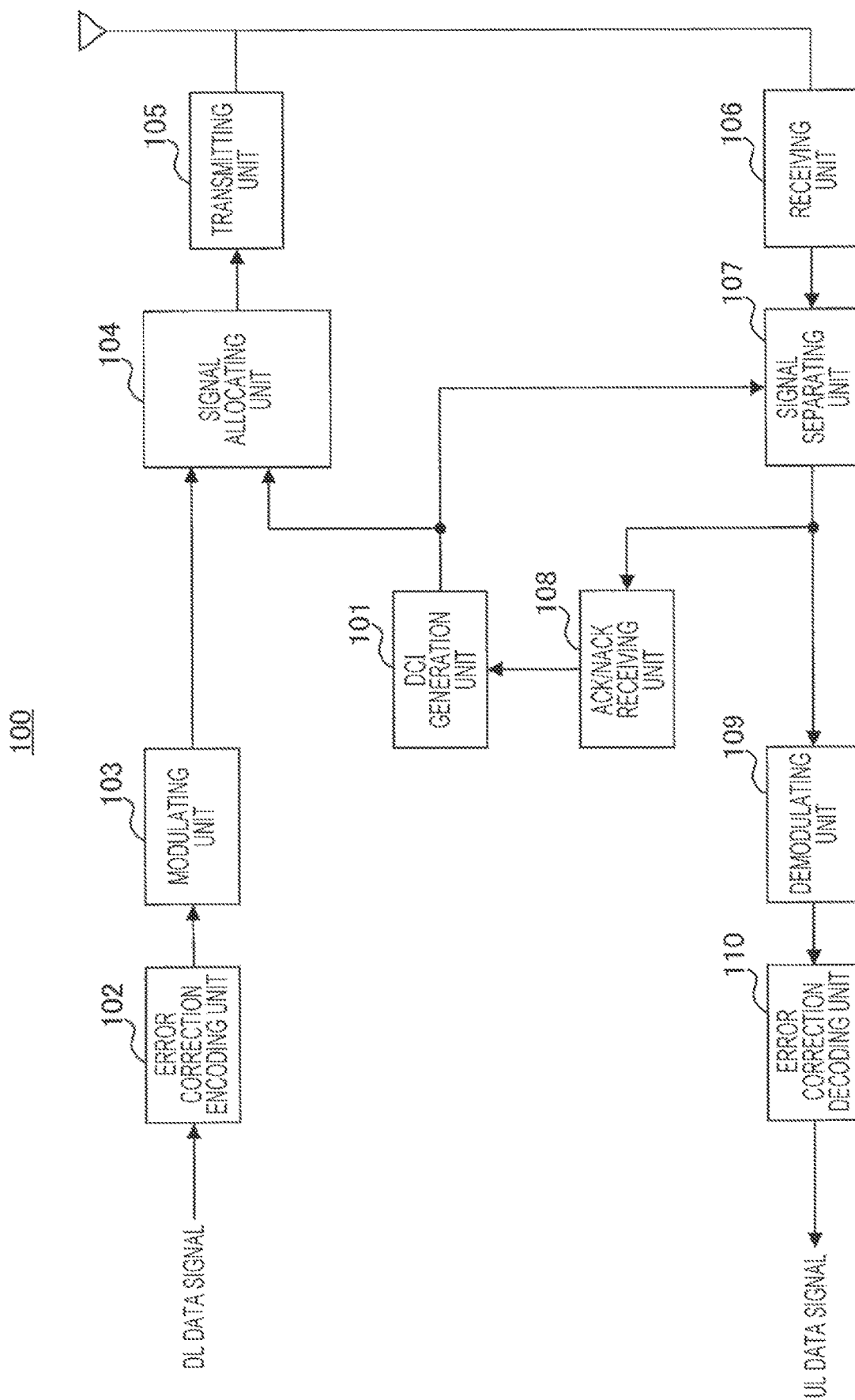
FIG. 2 is a block diagram illustrating a configuration of a base station according to Embodiment 1.

FIG. 2 is a block diagram illustrating a configuration of the base station 100 according to the present embodiment. In FIG. 2, the base station 100 includes a downlink control information (DCI) generation unit 101, an error correction encoding unit 102, a modulating unit 103, a signal allocating unit 104, a transmitting unit 105, a receiving unit 106, a signal separating unit 107, an ACK/NACK receiving unit 108, a demodulating unit 109, and an error correction decoding unit 110.

The DCI generating unit 101 determines which of an sTTI, a TTI, or both of an sTTI and a TTI is used to transmit transmission data signal (DL data signal). Furthermore, the DCI generating unit 101 determines which of an sTTI, a TTI, or both of an sTTI and a TTI is used to receive UL data signal. The DCI generating unit 101 determines whether or not it is necessary to retransmit the DL data signal on the basis of contents (ACK or NACK) of an ACK/NACK signal (i.e., an ACK/NACK signal received in response to the DL data signal (physical downlink shared channel (PDSCH)) supplied from the ACK/NACK receiving unit 108 and generates DCI for sTTI or DCI for TTI in accordance with a result of the determination. The DCI generating unit 101 supplies a control signal concerning DL (e.g., DL resource allocation information) to the signal allocating unit 104 and supplies a control signal concerning UL (e.g., UL resource allocation information) to the signal separating unit 107.

Furthermore, in a case where simultaneous transmission using an sTTI and a TTI occurs in a UL channel in the terminal 200, the DCI generating unit 101 predicts a transmission power margin level (e.g., remaining power) of the terminal 200, for example, from a power headroom and determines whether or not simultaneous transmission using an sTTI and a TTI is possible in the terminal 200 on the basis of the predicted margin level. For example, in a case where a signal of a higher priority than a TTI is allocated in an sTTI, the DCI generating unit 101 allocates the signal to an sTTI on a front side of a subframe in order to reserve transmission power.

Furthermore, the DCI generating unit 101 performs encoding processing and modulation processing on the generated DCI and then supplies the modulated DCI to the signal allocating unit 104 in order to transmit the modulated DCI to the terminal 200.

The error correction encoding unit 102 performs error correction encoding on transmission data signal (DL data signal) and upper layer signaling (not illustrated) and then supplies the encoded signal to the modulating unit 103.

The modulating unit 103 performs modulation processing on the signal received from the error correction encoding unit 102 and supplies the modulated signal to the signal allocating unit 104.

The signal allocating unit 104 allocates the signal received from the modulating unit 103 and the DCI that is a control signal received from the DCI generating unit 101 to a predetermined downlink resource on the basis of the DL resource allocation information supplied from the DCI generating unit 101. In this way, a transmission signal is formed. The transmission signal thus formed is supplied to the transmitting unit 105.

The transmitting unit 105 performs wireless transmission processing such as upconversion on the transmission signal supplied from the signal allocating unit 104 and then transmits the transmission signal to the terminal 200 via an antenna.

The receiving unit 106 receives a signal transmitted from the terminal 200 via an antenna, performs wireless reception processing such as downconversion on the received signal, and then supplies the signal to the signal separating unit 107.

The signal separating unit 107 specifies reception frequency and timing of a UL data signal and an ACK/NACK signal on the basis of the UL resource allocation information supplied from the DCI generating unit 101. Then, the signal separating unit 107 separates the UL data signal from the received signal and then supplies the UL data signal to the demodulating unit 109, and separates the ACK/NACK signal from the received signal and then supplies the ACK/NACK signal to the ACK/N ACK receiving unit 108.

The ACK/NACK receiving unit 108 supplies, to the DCI generating unit 101, contents (ACK or NACK) of the ACK/NACK signal that is received in response to the DL data signal and is then supplied from the signal separating unit 107.

The demodulating unit 109 performs demodulation processing on the signal supplied from the signal separating unit 107 and then supplies the signal thus obtained to the error correction decoding unit 110.

The error correction decoding unit 110 decodes the signal supplied from the demodulating unit 109 and thus obtains a reception data signal (UL data signal) received from the terminal 200.

[Configuration of Terminal]

Figure 3:
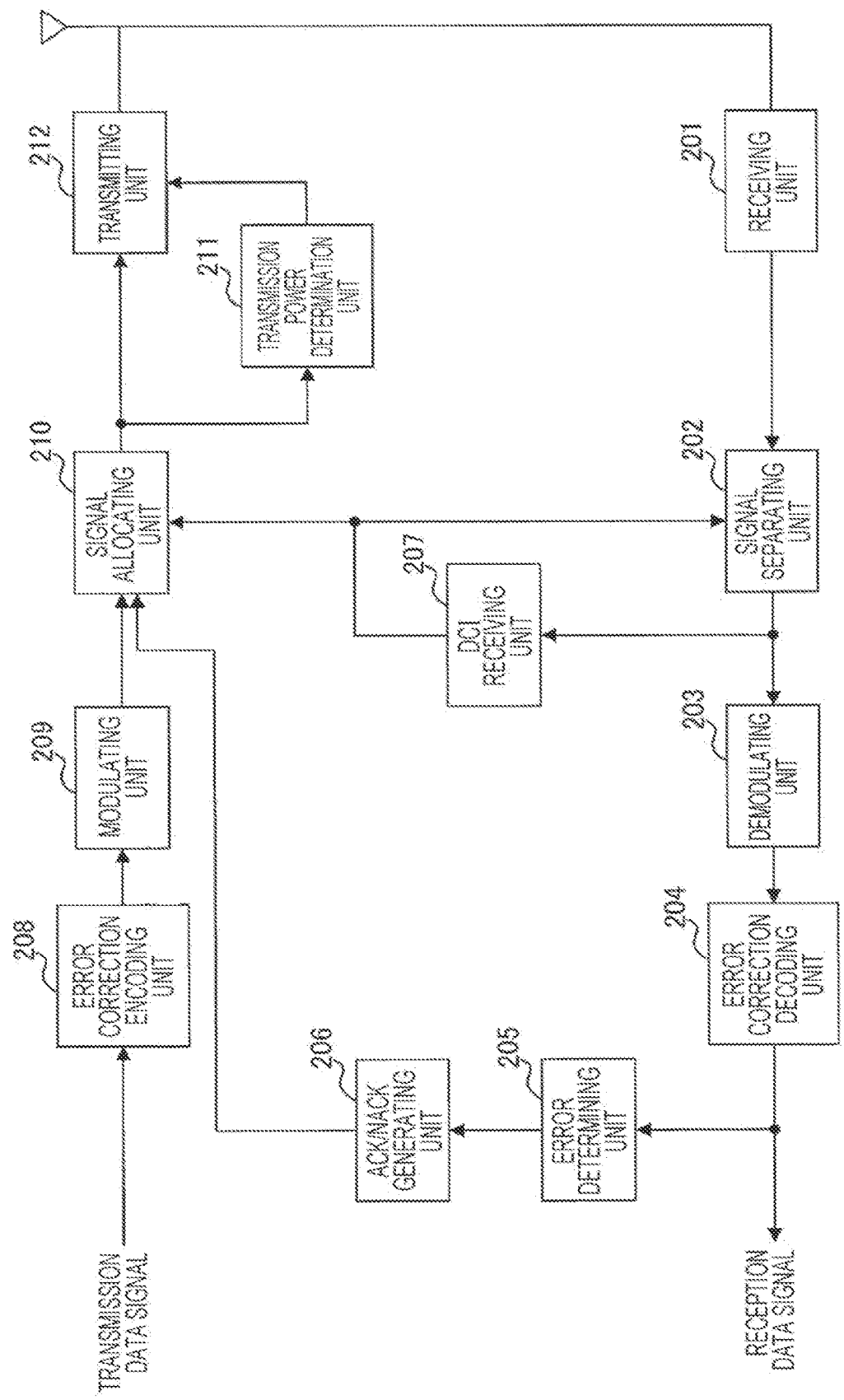
FIG. 3 is a block diagram illustrating a configuration of the terminal according to Embodiment 1.

FIG. 3 is a block diagram illustrating a configuration of the terminal 200 according to the present embodiment. In FIG. 3, the terminal 200 includes a receiving unit 201, a signal separating unit 202, a demodulating unit 203, an error correction decoding unit 204, an error determining unit 205, an ACK/NACK generating unit 206, a DCI receiving unit 207, an error correction encoding unit 208, a modulating unit 209, a signal allocating unit 210, a transmission power determination unit 211, and a transmitting unit 212.

The receiving unit 201 receives a reception signal (for example, including DCI for sTTI or DCI for TTI) via an antenna, performs reception processing such as downconversion on the reception signal, and then supplies the reception signal to the signal separating unit 202.

The signal separating unit 202 separates a signal placed in a resource to which DCI may be possibly allocated and then supplies the signal to the DCI receiving unit 207. Furthermore, the signal separating unit 202 separates a DL data signal from the reception signal on the basis of DL resource allocation information supplied from the DCI receiving unit 207 and then supplies the DL data signal to the demodulating unit 203.

The demodulating unit 203 demodulates the signal received from the signal separating unit 202 and then supplies the demodulated signal to the error correction decoding unit 204.

The error correction decoding unit 204 decodes the demodulated signal received from the demodulating unit 203 and outputs a reception data signal thus obtained. Furthermore, the error correction decoding unit 204 supplies the reception data signal to the error determining unit 205.

The error determining unit 205 detects an error by cyclic redundancy check of the reception data signal and then supplies a result of the detection to the ACK/NACK generating unit 206.

The ACK/NACK generating unit 206 generates ACK in a case where no error is detected and generates NACK in a case where an error is detected on the basis of the result of the detection of the reception data signal that is supplied from the error determining unit 205 and then supplies an ACK/NACK signal thus generated to the signal allocating unit 210.

The DCI receiving unit 207 performs demodulation processing and decoding processing on the DCI (the DCI for TTI or the DCI for sTTI) received from the signal separating unit 202. Then, the DCI receiving unit 207 supplies a control signal (e.g., DL resource allocation information) concerning DL indicated by the decoded DCI to the signal separating unit 202 and supplies a control signal (e.g., UL resource allocation information) concerning UL to the signal allocating unit 210.

The error correction encoding unit 208 performs error correction encoding on a transmission data signal (UL data signal) and then supplies the data signal thus encoded to the modulating unit 209.

The modulating unit 209 modulates the data signal received from the error correction encoding unit 208 and then supplies the modulated data signal to the signal allocating unit 210.

The signal allocating unit 210 allocates the data signal supplied from the modulating unit 209 to a resource on the basis of the UL resource allocation information received from the DCI receiving unit 207 and then supplies the data signal to the transmission power determination unit 211 and the transmitting unit 212. Furthermore, the signal allocating unit 210 allocates the ACK/NACK signal supplied from the ACK/NACK generating unit 206 to a resource for ACK/NACK or multiplexes the ACK/NACK signal with the UL data signal and then supplies the ACK/NACK signal to the transmission power determination unit 211 and the transmitting unit 212.

The transmission power determination unit 211 determines transmission power for the transmission signal and the ACK/NACK signal supplied from the signal allocating unit 210. Specifically, the transmission power determination unit 211 determines transmission power for a UL signal of a long TTI and transmission power for a UL signal for an sTTI. For example, in a case where transmission of the UL signal of the sTTI occurs during transmission of the UL signal of the long TTI, the transmission power determination unit 211 can decode resource allocation information indicated by DCI (DCI for sTTI) indicative of allocation of the UL signal (channel) of the sTTI before a timing of the start of transmission of the long TTI that corresponds to a subframe boundary. In addition, in a case where a priority of the UL signal of the sTTI is higher than a priority of the UL signal of the long TTI, the transmission power determination unit 211 reserves transmission power for the UL signal of the sTTI. Meanwhile, in a case where the priority of the UL signal allocated to the sTTI is lower than the priority of the UL signal of the long TTI, the transmission power determination unit 211 prioritizes the UL signal of the TTI in reserving transmission power. The transmission power determination unit 211 supplies transmission power information indicative of the determined transmission power to the transmitting unit 212.

The transmitting unit 212 sets transmission power on the basis of the transmission power information supplied from the transmission power determination unit 211 and then transmits the signal supplied from the signal allocating unit 210 via an antenna after performing transmission processing such as upconversion. In this way, the UL signal of the long TTI and the UL signal of the sTTI are transmitted with the transmission power determined by the transmission power determination unit 211 by using a resource indicated by the DCI.

[Operation of Base Station 100 and Terminal 200]

Operation of the base station 100 and the terminal 200 configured as above is described in detail below.

The following discusses an LTE system as an example. Specifically, it is assumed that a long TTI is 1 msec, which is a subframe length of LTE, and normal LTE operation is performed in the long TTI. Hereinafter, TTIs having different TTI lengths are referred to as a long TTI (or simply as a TTI) and a short TTI (sTTI).

The following describes an example in which the terminal 200 transmits a UL signal of an sTTI given a high priority during transmission of a physical uplink shared channel (PUSCH) or a physical uplink control channel (PUCCH) that is a UL signal (UL channel) of a long TTI.

In a case where it is determined before transmission of the UL signal of the TTI that the UL signal of the sTTI given a high priority is transmitted in a subframe identical to the UL signal of the TTI, the terminal 200 reserves transmission power for the sTTI.

The UL signal (UL channel) transmitted in the sTTI is, for example, ACK/NACK for an sPDSCH (a short PDSCH. DL data), an sPUSCH (UL data), periodic channel state information (CSI), aperiodic CSI, or an SR (scheduling request). A timing at which it is determined whether or not to reserve transmission power for the UL channel of the sTTI varies depending on the kind of UL channel as follows.

In the case of "ACK/NACK for an sPDSCH", the terminal 200 determines whether or not to reserve transmission power for the UL channel (ACK/NACK) of the sTTI at a timing at which decoding of downlink control channel (DCI) indicative of allocation of the sPDSCH is completed. The DCI indicates that the sPDSCH is allocated to an sTTI identical to an sTTI to which the DCI is allocated. Then, the terminal 200 transmits ACK/NACK in a UL sTTI after K TTIs (K is an integer) from reception of the sPDSCH. Therefore, the terminal 200 can determine that ACK/NACK is transmitted after K TTIs from reception of the DCI, at the timing of completion of decoding of the DCI even in a case where decoding of the sPDSCH has not been completed. That is, the terminal 200 can determine whether or not to reserve transmission power for ACK/NACK for the sPDSCH allocated by the DCI at the timing of completion of decoding of the DCI.

In the case of "sPUSCH", the terminal 200 determines whether or not to reserve transmission power for the UL channel (sPUSCH) of the sTTI at a timing at which decoding of DCI indicative of allocation of the sPUSCH is completed. The DCI indicates that the sPUSCH is allocated to a UL sTTI that is K TTIs later than the DCI. Therefore, the terminal 200 can determine that the sPUSCH is transmitted after K TTIs from reception of the DCI, at the timing of completion of decoding of the DCI. That is, the terminal 200 can determine whether or not to reserve transmission power for the sPUSCH allocated by the DCI at the timing of completion of decoding of the DCI.

In the case of "aperiodic CS I", the terminal 200 determines whether or not to reserve transmission power for the UL channel (aperiodic CSI) of the sTTI at a timing at which decoding of DCI indicative of allocation of the aperiodic CSI is completed. As in the case of the sPUSCH, the DCI indicates that the CSI is allocated to an sTTI that is K TTIs later than the DCI. Therefore, the terminal 200 can determine that the aperiodic CSI is transmitted after K TTIs from reception of the DCI at the timing of completion of decoding of the DCI. That is, the terminal 200 can determine whether or not to reserve transmission power for the aperiodic CSI allocated by the DCI at the timing of completion of decoding of the DCI.

Details of distribution of transmission power in the cases of ACK/NACK for an sPDSCH, an sPUSCH, and aperiodic CSI, i.e., distribution of transmission power for a UL channel indicated by DCI will be described later. In LTE/LTE-Advanced, K is 4 or more, but a different value may be used as for an sTTI.

In the case of the "periodic CSI", the terminal 200 determines whether or not to reserve transmission power for a UL channel (periodic CSI) of an sTTI at a timing at which decoding of upper layer signaling that allocates the periodic CSI is completed. Periodic transmission of the periodic CSI is indicated by the upper layer signaling. Therefore, the terminal 200 recognizes in advance in which subframe the CSI of the sTTI is transmitted. Accordingly, the terminal 200 reserves transmission power for the CSI of the sTTI in a case where a priority of the CSI of the sTTI is higher than a priority of the UL signal of the long TTI and does not reserve transmission power for the CSI of the sTTI in a case where the priority of the CSI of the sTTI is lower than the priority of the UL signal of the long TTI.

In the case of "SR", the terminal 200 cannot determine in advance whether or not to reserve transmission power for a UL channel (SR) of an sTTI. When an SR of an sTTI occurs during transmission of a long TTI, the terminal 200 checks transmission power (remaining power) that can be allocated to the SR. In a case where it is determined that sufficient transmission power can be allocated to transmission of the SR, the terminal 200 transmits the SR at any timing. Meanwhile, in a case where it is determined that sufficient transmission power cannot be allocated to transmission of the SR, the terminal 200 transmits the SR after waiting until the SR becomes transmittable in a next subframe or thereafter. Note, however, that in a case where transmission power has been already reserved for a UL signal (a UL signal other than the SR) of an sTTI, the terminal 200 may allocate the transmission power reserved in advance in a subframe to an SR occurring in the subframe.

Distribution of transmission power for a UL channel (ACK/NACK for an sPDSCH, an sPUSCH, or aperiodic CSI) allocated by an sPDCCH (DCI) is described in detail below.

Operation Example 1

Figure 4B:
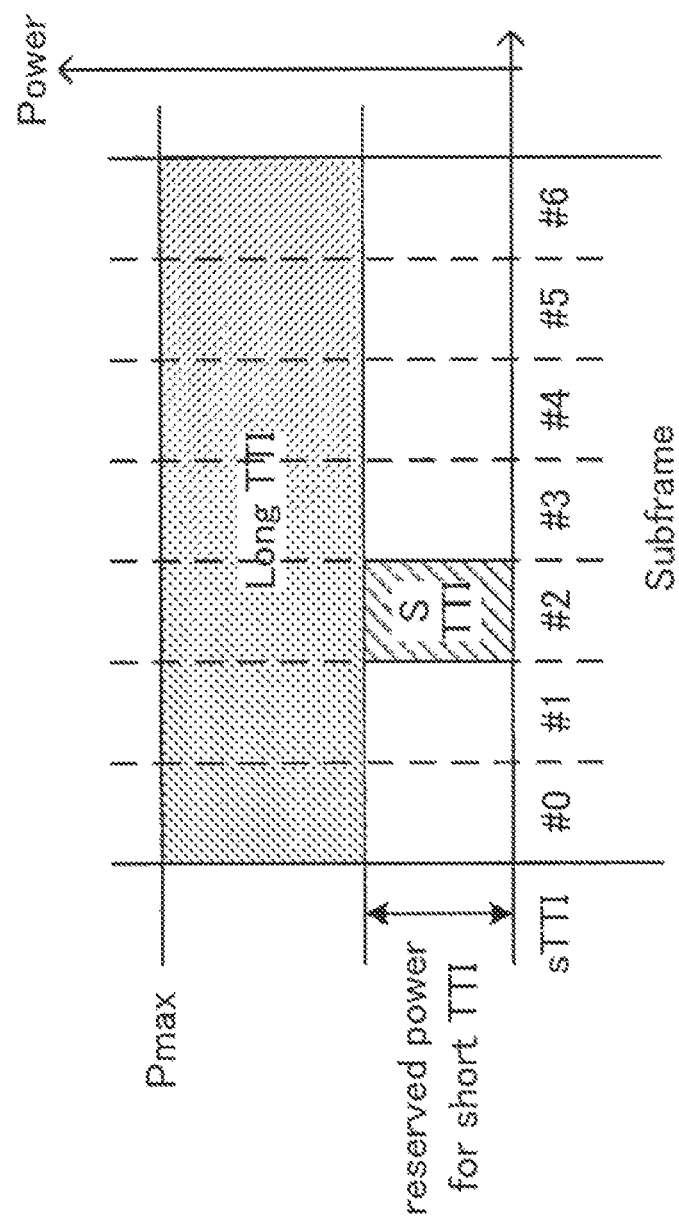
FIG. 4B illustrates an example of distribution of transmission power according to Operation Example 1 of Embodiment 1.
Figure 5B:
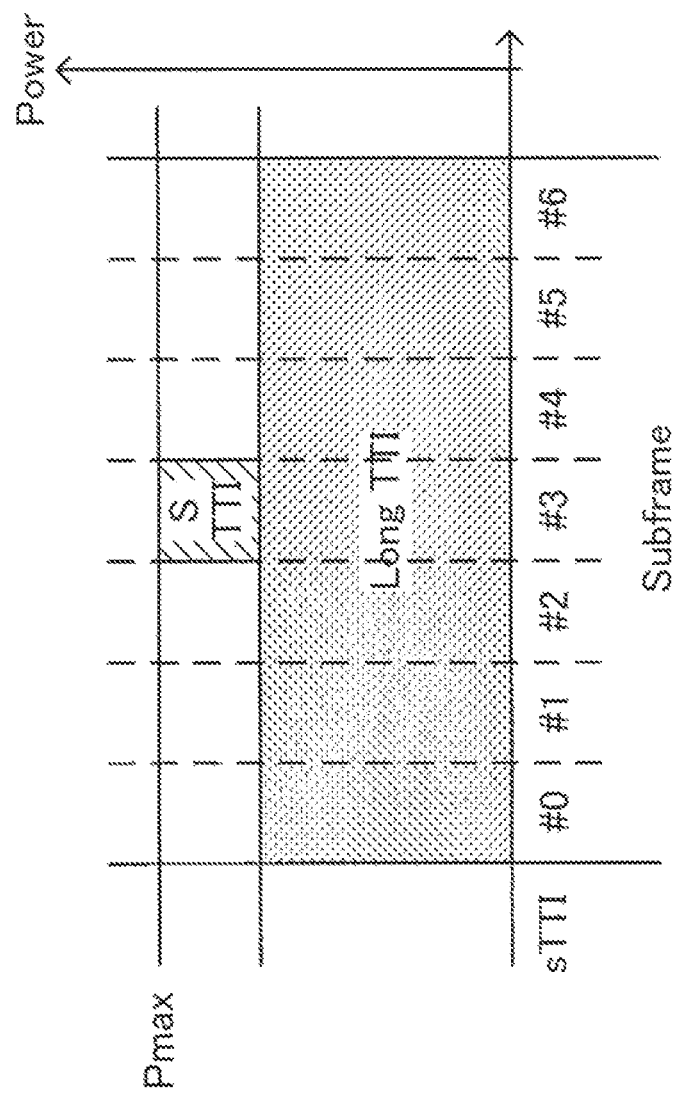
FIG. 5B illustrates an example of distribution of transmission power according to Operation Example 1 of Embodiment 1.

FIGS. 4A and 5A illustrate an example of a timing of an sTTI PDCCH (DCI) indicative of allocation of a UL signal (e.g., ACK/NACK for an sPDSCH, an sPUSCH, or aperiodic CSI) of an sTTI and a timing of the UL signal (sTTI sPUSCH/sPUCCH). FIGS. 4B and 5B illustrate an example of distribution of transmission power to a UL signal of an sTTI and a UL signal of a long TTI in a subframe #1 of FIGS. 4A and 5A in the terminal 200.

In FIGS. 4A and 5A, a short TTI (sTTI) is constituted by 2 symbols (i.e. 7 sTTIs per ms (TTI)) in both DL and UL.

It is assumed that a sum of desired transmission power for the UL signal of the sTTI and desired transmission power for the UL signal of the TTI exceeds maximum transmission power (Pmax) of the terminal 200.

The DCI is allocated to 2 symbols (i.e., 1 sTTI) of DL. Furthermore, an interval between the DCI and a UL signal allocated by the DCI is K=4. That is, the UL signal allocated by the DCI is transmitted after 4 sTTIs from transmission of the DCI.

Furthermore, it is assumed that a processing time needed for decoding of the DCI and adjustment of transmission power of the UL signal in the terminal 200 is 2 symbols.

In FIG. 4A, the UL signal is allocated to an sTTI #2 of the subframe #1. This UL signal is allocated by an sPDCCH that is transmitted 4 sTTIs earlier, i.e., DCI transmitted in a sixth sTTI (sTTI #5) of the subframe #0.

The terminal 200 decodes the DCI received in the sTTI #5 of the subframe #0 within 2 symbols. That is, the terminal 200 completes decoding in an sTTI #6 of a subframe #0 followed by the subframe #1. Then, in a case where a UL signal of an sTTI given a high priority is allocated by the decoded DCI, the terminal 200 reserves transmission power for the sTTI and starts transmission of a UL signal of a long TTI in the subframe #1 by using remaining transmission power other than the reserved transmission power.

That is, the terminal 200 reserves desired transmission power for transmission of the UL signal of the sTTI in the sTTI #2 of the subframe #1 as illustrated in FIG. 4B at a timing of completion of decoding of the DCI in the subframe #0 before start of the subframe #1 and distributes remaining transmission power to the UL signal (TTI PUSCH/PUCCH) of the long TTI transmitted in the subframe #1. This allows the terminal 200 to transmit the UL signal of the sTTI in the sTTI #2 of the subframe #1 by utilizing the reserved transmission power.

Meanwhile, in FIG. 5A, a UL signal is allocated to an sTTI #3 of the subframe #1. This UL signal is allocated by an sPDCCH that is transmitted 4 sTTIs earlier, i.e., DCI transmitted in a seventh sTTI (sTTI #6) of the subframe #0.

The terminal 200 decodes the DCI received in the sTTI #6 of the subframe #0 within 2 symbols. However, as illustrated in FIG. 5A, the terminal 200 decodes the DCI in a section of the subframe #1. That is, the terminal 200 does not complete decoding of the DCI concerning an sTTI before a timing at which transmission power of the UL signal of the TTI is changeable, i.e., before start of the subframe #1.

In view of this, the terminal 200 starts transmission of the UL signal of the long TTI of the subframe #1 by using desired transmission power without waiting for decoding of the DCI of the sTTI. That is, the terminal 200 does not reserve desired transmission power for transmission of the UL signal of the sTTI in the sTTI #3 of the subframe #1 at a timing of start of the subframe #1. Therefore, as illustrated in FIG. 5B, the terminal 200 transmits, in the sTTI #3 of the subframe #1, the UL signal of the sTTI by using remaining transmission power other than the transmission power used for the UL signal of the long TTI even in a case where a priority of the UL signal of the sTTI is high.

That is, in the example illustrated in FIGS. 4A and 5A, in a case where DCI indicative of allocation of a UL signal given a high priority is allocated between sTTI #0 and sTTI #2 in the subframe #1, the terminal 200 can complete decoding of the DCI corresponding to the UL signal (i.e., specifies allocation of the UL signal of the sTTI) before start of the subframe #1 and reserve desired transmission power for the UL signal in advance. This allows the terminal 200 to transmit the UL signal of the sTTI given a high priority with sufficient transmission power even during transmission of the UL signal of the TTI.

Meanwhile, in the example illustrated in FIGS. 4A and 5A, in a case where DCI indicative of allocation of the UL signal is allocated between sTTI #3 and sTTI #6 in the subframe #1, decoding of the DCI is not completed before start of the subframe #1. Therefore, even in a case where DCI indicative of allocation of a UL signal given a high priority is received between sTTI #3 and sTTI #6 of the subframe #1, the terminal 200 transmits a UL signal of a long TTI transmitted in the subframe #1 by using desired transmission power without reserving desired transmission power for transmission of the UL signal given a high priority.

Furthermore, as illustrated in FIG. 5B, the terminal 200 keeps transmission power for UL transmission in the long TTI at a constant level within the same subframe (subframe #1) after start of transmission of the UL signal of the long TTI. In a case where multilevel modulation (16QAM, 64QAM, 256QAM) that uses an amplitude is used as a modulation method, there occurs a problem that a change of transmission power of a signal in the middle of transmission of the signal causes a difference in power between a reference signal (demodulation reference signal (DMRS)) and reception data in the base station 100, thereby preventing the reception data from being correctly demodulated. Therefore, quality of channel estimation can be maintained in the case of multilevel modulation by keeping transmission power of the UL signal of the long TTI at a constant level. Furthermore, in a case where a PUCCH is transmitted from the terminal 200 and transmission power is determined by the base station 100, power of the PUCCH is easily detected in the base station 100 by keeping transmission power of the UL signal of the long TTI at a constant level.

Operation Example 2

In Operation Example 2, a time difference between DL and UL is considered in addition to the operation described in Operation Example 1.

Specifically, as for an actual UL frame timing, a UL transmission timing is shifted forward by an instruction of Timing Advance (TA) while using a DL frame reception timing of a UE as a reference although a time difference between DL and UL is not illustrated in Operation Example 1 (FIGS. 4A and 5A). TA is a value for adjustment that allows UL signals transmitted from a plurality of UEs to be synchronized with each other in a base station. A distance (i.e., propagation delay) from a base station varies from one UE to another. In general, an absolute value of TA becomes larger as propagation delay between a base station and a UE becomes longer, and the TA value becomes closer to 0 as the propagation delay becomes shorter.

That is, an sTTI in which transmission power for a UL signal of an sTTI can be reserved (i.e., a timing at which it is determined whether or not to reserve transmission power for the sTTI) changes in accordance with a TA value. In view of this, in Operation Example 2, the terminal 200 determines whether or not to reserve transmission power for a UL signal transmitted in an sTTI of UL in accordance with a TA value.

In LTE/LTE-Advanced, TA is defined so that $N_{TA}$ is equal to or larger than 0 and is equal to or smaller than 20512, and a UL transmission timing is shifted forward by $(N_{TA}\ N_{TA\ offset}) \times T_s$ seconds.

In the case of frequency division duplex (FDD), $N_{TA}$ offset=0, and in the case of TDD (Time Division Duplex), $N_{TA}$ offset is 624. $T_s$ is 1/(15000*2048), and a length of an initial symbol within a slot is 2208 $T_s$ seconds and a length of a remaining symbol is 2192 $T_s$ seconds in the case of Normal CP.

An example of a UL transmission timing taking TA into consideration is described below with reference to FIGS. 6 through 8.

Figure 6:
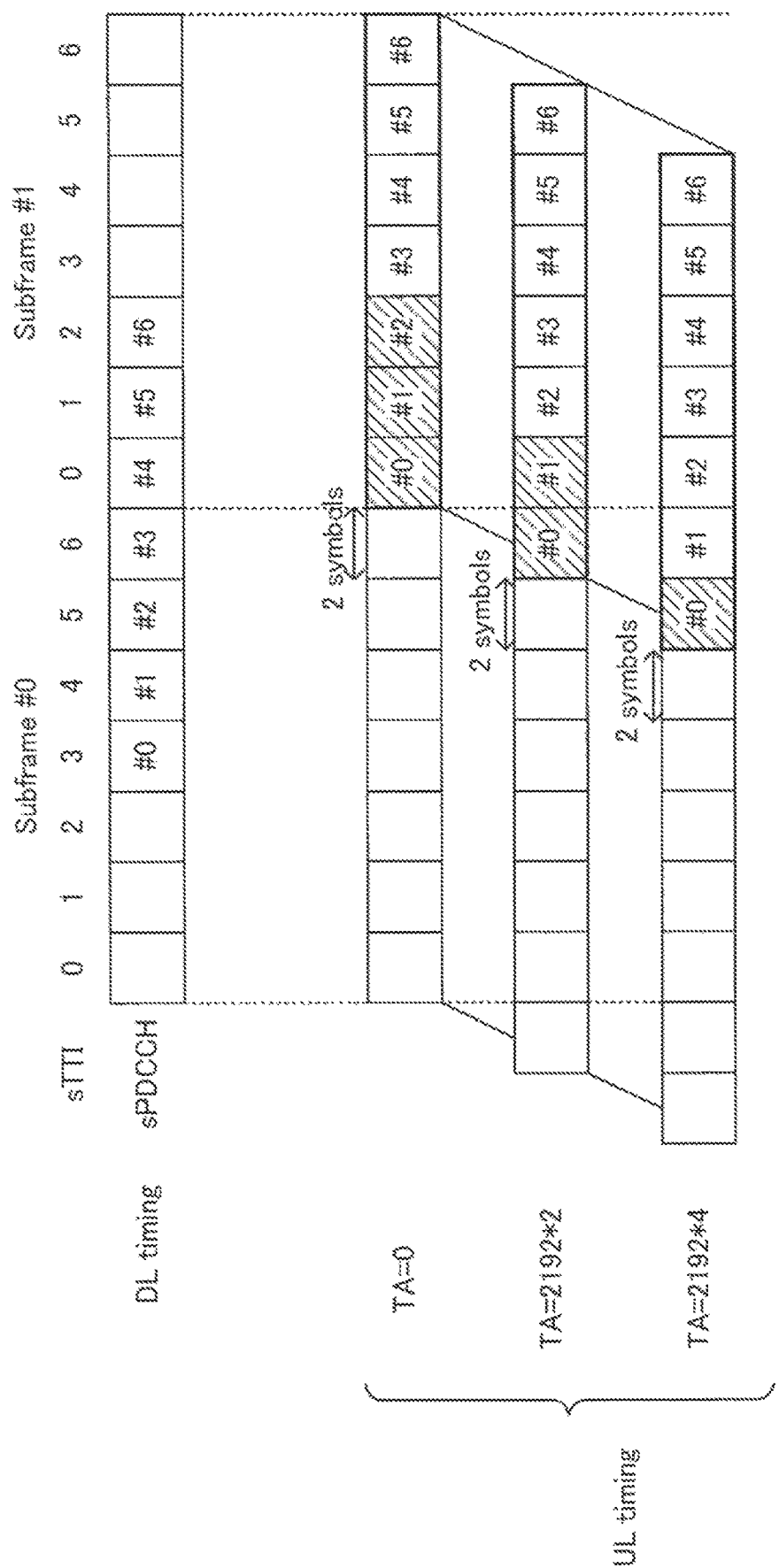
FIG. 6 illustrates an example of a transmission timing according to Operation Example 2 of Embodiment 1.
Figure 7:
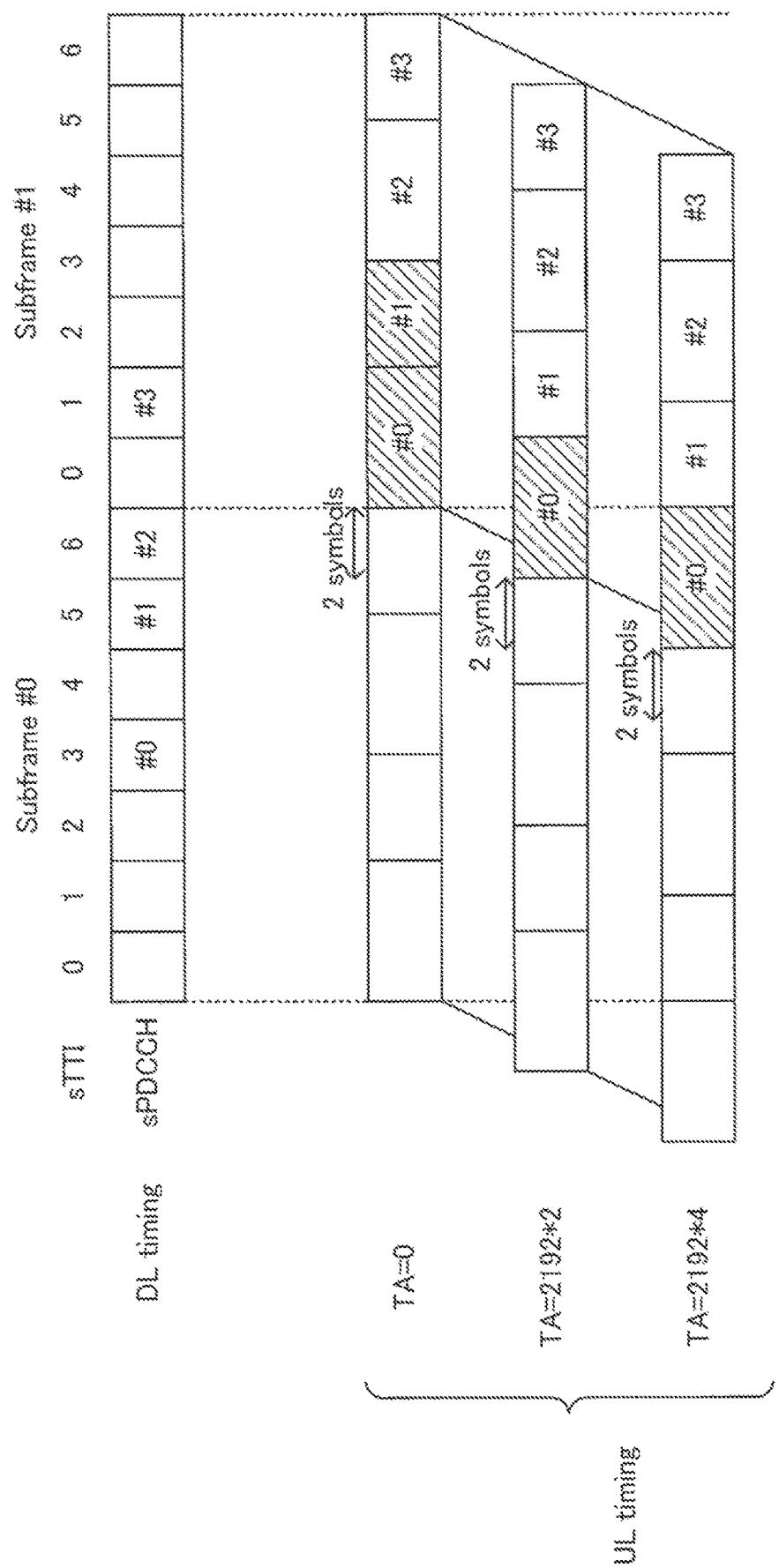
FIG. 7 illustrates an example of a transmission timing according to Operation Example 2 of Embodiment 1.
Figure 8:
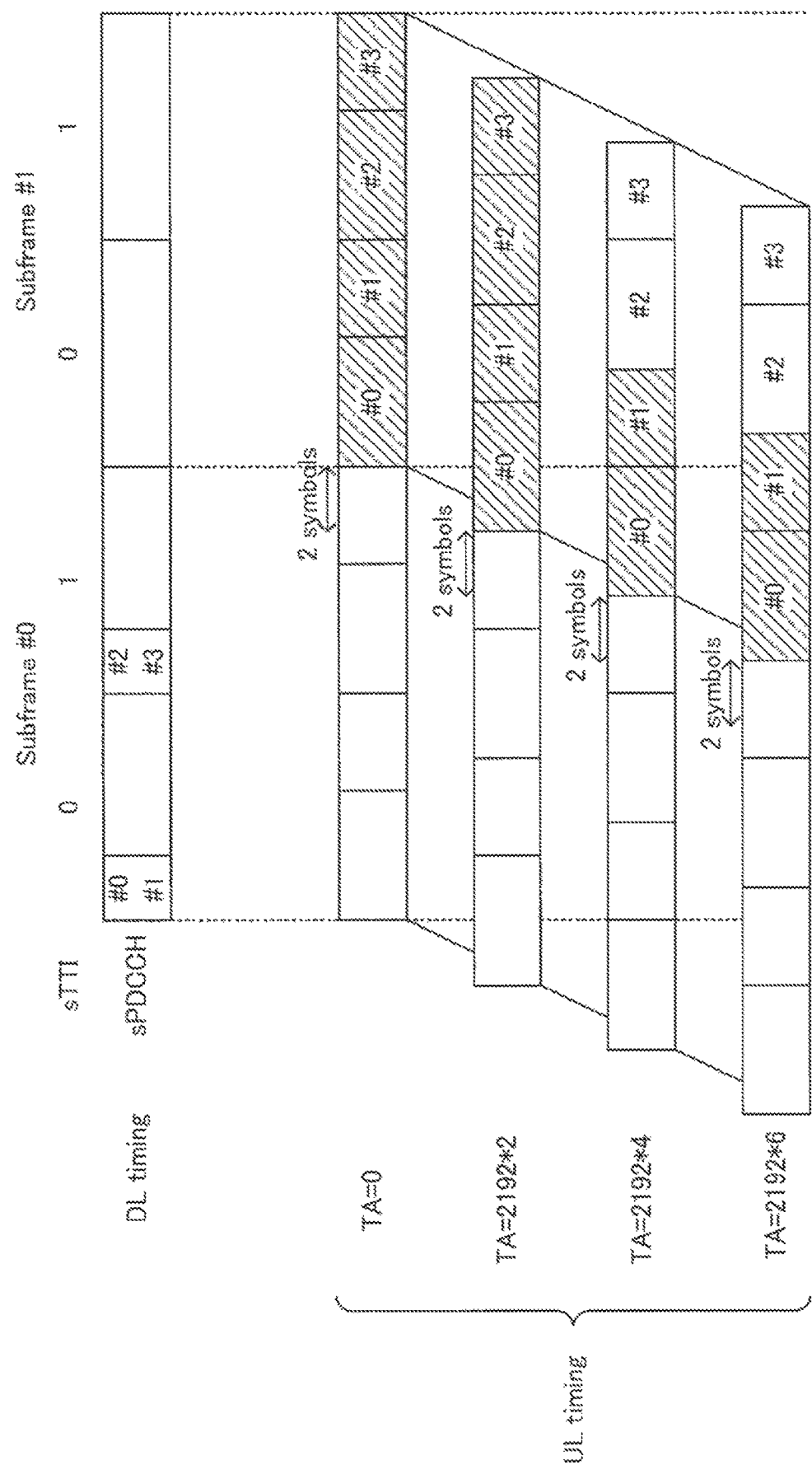
FIG. 8 illustrates an example of a transmission timing according to Operation Example 2 of Embodiment 1.

In FIGS. 6 through 8, DCI is allocated to 2 symbols of DL (i.e., 1 sTTI). In FIGS. 6 through 8, it is assumed that a processing time necessary for decoding of the DCI and adjustment of transmission power of a UL signal in the terminal 200 is 2 symbols.

FIG. 6 illustrates UL transmission timings in a case where an sTTI length is 2 symbols (i.e., 7 sTTIs per ms (TTI)) both in DL and UL.

FIG. 6 illustrates UL transmission timings in cases where TA is 0, TA is 2192×2 (corresponding to 2 symbols), and TA is 2192×4 (corresponding to 4 symbols).

First, the case where TA is 0 illustrated in FIG. 6 (i.e., a timing similar to FIGS. 4A and 5A) is described. In this case, in a case where DCI is allocated to a DL sTTI #5 or earlier (any of sTTIs #3 through #5) of a subframe #0, the terminal 200 can complete decoding of the DCI before start of a subframe #1 and reserve transmission power for an sTTI within the subframe #1. That is, in the case where TA is 0 illustrated in FIG. 6, the terminal 200 can reserve transmission power for an sTTI in advance in a case where a UL signal of an sTTI is transmitted in any of UL sTTIs #0 through #2 of the subframe #1.

Next, the case where TA is 2192×2 (corresponding to 2 symbols) illustrated in FIG. 6 is described. In this case, in a case where DCI is allocated to a DL sTTI #4 or earlier (any of sTTIs #3 and #4) of the subframe #0, the terminal 200 can complete decoding of the DCI before start of the subframe #1 and reserve transmission power for an sTTI within the subframe #1. That is, in a case where TA is 2192×20 illustrated in FIG. 6, the terminal 200 can reserve transmission power for an sTTI in advance in a case where a UL signal of an sTTI is transmitted in any of UL sTTIs #0 and #1 of the subframe #1. Accordingly, in the case where TA is 2192×2, the number of sTTIs for which transmission power can be reserved is smaller by 1 sTTI than the case where TA is 0.

Similarly, in a case where TA is 2192×4 (corresponding to 4 symbols) illustrated in FIG. 6, the terminal 200 can reserve transmission power for an sTTI in an UL sTTI #0 of the subframe #1.

FIG. 7 illustrates UL transmission timings in a case where an sTTI length of DL is 2 symbols (i.e., 7 sTTIs per ms (TTI)) and an sTTI length of UL is 3/4 symbols (i.e., 4 sTTIs per ms (TTI)).

FIG. 7 illustrates UL transmission timings in cases where TA is 0, TA is 2192×2 (corresponding to 2 symbols), and TA is 2192×4 (corresponding to 4 symbols).

In FIG. 7, it is assumed that a transmission timing of DCI is based on a DL sTTI. Specifically, it is assumed that DCI is transmitted 4 DL sTTIs earlier than a transmission timing of a UL signal in a UL sTTI. For example, allocation of a UL sTTI #0 of the subframe #1 is indicated by DCI transmitted in a DL sTTI #3 of the subframe #0.

First, the case where TA is 0 illustrated in FIG. 7 is described. In this case, in a case where DCI is allocated to a DL sTTI #5 or earlier (sTTI #3 or sTTI #5) of the subframe #0, the terminal 200 can complete decoding of the DCI before start of the subframe #1 and reserve transmission power for an sTTI within the subframe #1. That is, in the case where TA is 0 illustrated in FIG. 7, the terminal 200 can reserve transmission power for an sTTI in advance in a case where a UL signal of an sTTI is transmitted in UL sTTI #0 or #1 of the subframe #1.

Next, the case where TA is 2192×2 (corresponding to 2 symbols) illustrated in FIG. 7 is described. In this case, in a case where DCI is allocated to a DL sTTI #4 or earlier (sTI #3) of the subframe #0, the terminal 200 can complete decoding of the DCI before start of the subframe #1 and reserve transmission power for an sTTI within the subframe #1. That is, in the case where TA is 2192×20 illustrated in FIG. 7, the terminal 200 can reserve transmission power for an sTTI in advance in a case where a UL signal of an sTTI is transmitted in a UL sTTI #0 of the subframe #1. That is, in the case where TA is 2192×2, the number of sTTIs for which transmission power can be reserved is smaller by 1 sTTI than the case where TA is 0.

Similarly, in the case where TA is 2192×4 (corresponding to 4 symbols) illustrated in FIG. 7, the terminal 200 can reserve transmission power for an sTTI in a UL sTTI #0 of the subframe #1.

FIG. 8 illustrates UL transmission timings in cases where an sTTI length of DL is 1 slot (i.e., 2 sTTIs per ms (TTI)) and an sTTI length of UL is 3/4 symbols (i.e., 4 sTTIs per ms (TTI)).

FIG. 8 illustrates UL transmission timings in cases where TA is 0, TA is 2192×2 (corresponding to 2 symbols), TA is 2192×4 (corresponding to 4 symbols), and TA is 2192×6 (corresponding to 6 symbols).

In FIG. 8, it is assumed that a transmission timing of DCI is based on a UL sTTI. Specifically, it is assumed that DCI is transmitted 4 UL sTTIs earlier than a transmission timing of a UL signal in a UL sTTI. For example, allocation of UL sTTIs #0 and #1 of a subframe #1 is indicated by DCI transmitted in a DL sTTI #0 of a subframe #0, and allocation of UL sTTIs #2 and #3 of the subframe #1 is indicated by DCI transmitted in a DL sTTI #1 of the subframe #0. As illustrated in FIG. 8, DCI is transmitted in 2 symbols on a front side (e.g., a part corresponding to a PDCCH) of each sTTI (1 slot length).

First, the cases where TA is 0 and TA is 2192×2 illustrated in FIG. 8 are described. In these cases, in a case where DCI concerning UL using the subframe #1 is allocated by a timing that is 2 symbols earlier than a subframe boundary of UL, the terminal 200 can complete decoding of the DCI before start of the subframe #1 and reserve transmission power for an sTTI within the subframe #1. That is, in the cases where TA is 0 and TA is 2192×2 illustrated in FIG. 8, the terminal 200 can reserve transmission power for an sTTI in advance in a case where a UL signal of an sTTI is transmitted in any of UL sTTIs #0 through #3 (i.e., all sTTIs) of the subframe #1.

Next, the cases where TA is 2192×4 and TA is 2192×6 illustrated in FIG. 8 are described. In these cases, in a case where DCI concerning UL using the subframe #1 is allocated by a timing that is 2 symbols earlier than a subframe boundary of UL, the terminal 200 can complete decoding of the DCI before start of the subframe #1 and reserve transmission power for an sTTI within the subframe #1. That is, in the cases where TA is 2192×4 and TA is 2192×6 illustrated in FIG. 8, the terminal 200 can reserve transmission power for an sTTI in advance in a case where a UL signal of an sTTI is transmitted in a UL sTTI #0 or #1 of the subframe #1.

As illustrated in FIGS. 6 through 8, a UL transmission timing shifts forward as TA becomes longer. Accordingly, a period from reception of DCI in the terminal 200 to start of a next subframe becomes shorter, and the number of sTTIs for which UL transmission power can be reserved becomes smaller. As illustrated in FIGS. 6 through 8, a possibility of reserving transmission power is higher in an earlier sTTI among a plurality of sTTIs of a subframe even in a case where TA is long.

In view of this, for example, the base station 100 may allocate, to an earlier sTTI in each subframe, DCI (DCI for an sTTI) indicative of allocation of a UL signal of a high priority transmitted in an sTTI in the terminal 200. This allows the terminal 200 to complete demodulation of DCI before start of a subframe in which a UL signal whose allocation is indicated by the DCI is to be transmitted, thereby increasing a possibility of reserving desired transmission power for the UL signal of a high priority.

In the above description, a period needed to decode DCI is 2 symbols. However, a period (symbol length) needed to decode DCI is not limited to 2 symbols and may be 1 symbol or may be 3 or more symbols.

A period needed to decode DCI may be defined not by the number of symbols but by the number of sTTIs or a period of time (second).

The following describes a method for defining, by using the number of symbols, the number of sTTIs, or a period of time, a criterion value for determining how earlier than a subframe boundary of DL allocation need be indicated by DCI in order that the terminal 200 can reserve transmission power for a UL signal of an sTTI.

For example, the terminal 200 can decide transmission power for a UL signal of an sTTI on the basis of the criterion value for determination. Furthermore, the base station 100 can specify, for scheduling, transmission power for a UL signal transmitted from the terminal 200 on the basis of the criterion value for determination.

[Case of the Number of Symbols]

A case where the criterion value for determination is defined by the number of symbols as illustrated in FIGS. 6 through 8 is described.

The criterion value (the number of symbols) for determining by how many symbols earlier than a DL subframe boundary allocation needed be indicated by DCI in order to reserve transmission power for a UL signal of an sTTI can be defined as shown in Table 1.

TABLE 1

| | The number of symbols |
|---|---|
| $(N_{TA} + N_{TA\ offset})$ is equal to or smaller than 624 | N |
| $(N_{TA} + N_{TA\ offset})$ is equal to or smaller than 2192 + 624 and is larger than 624 | N + 1 |

TABLE 1-continued

| | The number of symbols |
|---|---|
| $(N_{TA} + N_{TA\ offset})$ is equal to or smaller than 2192 * (X + 1) + 624 and is larger than 2192 * X + 624 | N + 1 + X (X is 1 to 5) |
| $(N_{TA} + N_{TA\ offset})$ is equal to or smaller than (2192 * 7 + 16) + 624 and is larger than 2192 * 6 + 624 | N + 7 |
| $(N_{TA} + N_{TA\ offset})$ is equal to or smaller than (2129 * (X + 1) + 16) + 624 and is larger than 2192 * X + 16 + 624 | N + 1 + X (X is 7 or 8) |
| $(N_{TA} + N_{TA\ offset})$ is equal to or smaller than 20512 + 624 and is larger than 2192 * 9 + 16 + 624 | N + 10 |

N is the number of symbols needed to decode DCI, i.e., a minimum number of symbols (e.g., N is 2 symbols in FIGS. 6 through 8) used as the criterion value for determination. The criterion value for determination is the minimum number of symbols N in a case where TA is equal to or smaller than 624 in order to encompass a case where the minimum number of symbols N is used in TDD. That is, in Table 1, a period of time (N-symbol length−624 $T_s$) is reserved for decoding processing on the terminal 200 side.

The criterion value for determination can be determined irrespective of a TTI length of an sTTI in a case where the criterion value for determination is defined by the number of symbols. Therefore, the base station 100 and the terminal 200 can determine whether or not to reserve transmission power for an sTTI irrespective of change of setting of an sTTI on the basis of the criterion value for determination. However, there is a possibility that the minimum value N (the number of symbols) used as the criterion value for determination varies depending on an sTTI length.

[Case of the Number of sTTIs]

A case where the criterion value for determination is defined by the number of sTTIs of DL.

The criterion value (the number of sTTIs) for determining by how many sTTIs earlier than a subframe boundary allocation need be indicated by DCI in order to reserve transmission power for a UL signal of an sTTI can be determined as shown in Table 2. In Table 2, it is assumed that a TTI length of a DL sTTI is 2 symbols (see, for example, FIGS. 6 and 7) and a period needed to decode DCI is 1 sTTI or more (i.e., N=1 sTTI).

TABLE 2

| | The number of sTTIs |
|---|---|
| $(N_{TA} + N_{TA\ offset})$ is equal to or smaller than 624 | N |
| $(N_{TA} + N_{TA\ offset})$ is equal to or smaller than 2192 * 2 + 624 and is larger than 624 | N + 1 |
| $(N_{TA} + N_{TA\ offset})$ is equal to or smaller than 2192 * 4 + 624 and is larger than 2192 * 2 + 624 | N + 2 |
| $(N_{TA} + N_{TA\ offset})$ is equal to or smaller than 2192 * 6 + 624 and is larger than 2192 * 4 + 624 | N + 3 |
| $(N_{TA} + N_{TA\ offset})$ is equal to or smaller than 2129 * 8 + 16 + 624 and is larger than 2192 * 6 + 624 | N + 4 |
| $(N_{TA} + N_{TA\ offset})$ is equal to or smaller than 20512 + 624 and is larger than 2192 * 8 + 624 | N + 5 |

In a case where a TTI length of a DL sTTI is 1 slot (see, for example, FIG. 8), the number of sTTIs that is the criterion value for determination is the minimum value N in a case where TA is equal to or less than Y as shown in Table 3. In Table 3, Y is a value that satisfies (0.5 ms*N(sTTI)−DCI length−YTS), which is a minimum period needed to decode DCI.

TABLE 3

| | sTTI |
|---|---|
| $(N_{TA} + N_{TA\ offset})$ is equal to or smaller than Y | N |
| $(N_{TA} + N_{TA\ offset})$ is equal to or smaller than 2192 * 7 + 16 + Y and is larger than Y | N + 1 |
| $(N_{TA} + N_{TA\ offset})$ is equal to or smaller than 20512 + 624 and is larger than 2192 * 7 + 16 + Y | N + 2 |

[Case of Period of Time (Second)]

A case where the criterion value for determination is defined by a period of time.

The criterion value (period of time (second) for determining by how many seconds earlier than a subframe boundary allocation needed be indicated by DCI in order to reserve transmission power for a UL signal of an sTTI is defined as follows:

$$(N_{TA} + N_{TA}\ \text{offset})T_s + Z[\text{second}]$$

Note that Z is a period of time needed to decode DCI. That is, in a case where DCI is received $((N_{TA}\ N_{TA}\ \text{offset})T_s\ Z)$ or more earlier, the terminal 200 can decode DCI before a subframe boundary and therefore can reserve transmission power for a UL signal of an sTTI.

However, as TA becomes longer, not only the period needed to decode DCI, but also a period for decoding of an sPDSCH and a period that can be used for generation of an sPUSCH also become shorter. Therefore, in a case where an sTTI length is shortened and an interval between DCI and a UL channel becomes shorter accordingly, there is a possibility that decoding of an sPDSCH and generation of an sPUSCH are not completed in time in a case where a TA length is long. Therefore, in a case where an sTTI length is shortened, a maximum value of a TA length may be shortened.

As described above, the base station 100 and the terminal 200 can determine whether or not transmission power for a UL signal can be reserved for which sTTI of a subframe by using a TA value and the criterion value for determination (the number of symbols, the number of sTTIs, or a period of time). This allows the base station 100 and the terminal 200 to have common recognition concerning adjustment of transmission power. Therefore, the base station 100 can specify, for efficient scheduling, for which sTTI transmission power can be reserved.

Operation Example 3

In a case where a plurality of UL signals of sTTIs are allocated within the same subframe, the terminal 200 determines reserved transmission power on the basis of a UL signal for which desired transmission power is highest among UL signals of sTTIs given a higher priority than a UL signal of a TTI transmitted simultaneously in the same subframe.

Transmission power to be reserved varies depending on a kind of UL signal (channel) or a resource amount (the number of RBs) needed for transmission.

Note that the terminal 200 also transmits a UL signal of an sTTI given a lower priority than the UL signal of the TTI transmitted simultaneously within the same subframe among the UL signals of the sTTIs by using remaining transmission power in a case where transmission power has been already reserved for another UL signal of an sTTT transmitted in the same subframe (i.e., in a case where there is unused transmission power).

Furthermore, the terminal 200 reserves transmission power for an sTTI in a case where a UL signal given a high priority is allocated to an early sTTI within a subframe. In this case, the terminal 200 can transmit an sTTI allocated to a later part of a subframe by using the reserved transmission power.

The terminal 200 can thus effectively use transmission power reserved for a UL channel of an sTTI.

Operation Examples 1 through 3 have been described above.

As described above, in the present embodiment, in a case where decoding of DCI indicative of allocation of a UL signal of an sTTI transmitted within a long TTI (subframe) is completed before start of transmission of a UL signal of the long TTI, the terminal 200 reserves desired transmission power for the UL signal of the sTTI in the long TTI (subframe). Furthermore, in a case where a priority of the channel of the sTTI is higher than a priority of the long TTI, the terminal 200 reserves transmission power for transmission of the channel of the sTTI. This makes it possible to reserve sufficient transmission power for a UL signal of an sTTI given a high priority even in the middle of transmission of a UL signal of a long TTI. In a case where transmission power for a channel of an sTTI cannot be reserved, the terminal 200 can allocate sufficient transmission power for a UL signal of a long TTI.

According to the present embodiment, it is therefore possible to properly set distribution of transmission power in a case where TTI lengths are different.

In the present embodiment, in a case where an sPUCSH or an sPDSCH of an sTTI is allocated by semi persistent schedule (SPS), the terminal 200 can specify in advance whether or not a UL signal of an sTTI is to be transmitted. Therefore, in a case where SPS is applied, the terminal 200 may reserve transmission power for a UL sTTI without waiting for decoding of DCI. Even in a case where a UL signal is allocated to a late sTTI of a subframe, the terminal 200 can thus reserve transmission power for the UL sTT as long as a priority of the UL signal of the sTTI is high.

In the present embodiment, a period needed to decode DCI sometimes varies from one terminal 200 to another. In this case, a period needed to decode DCI may be determined on the basis of capability (UE capability) of the terminal 200. In a case where a period needed to decode DCI in the terminal 200 is unknown in the base station 100, the terminal 200 may determine from which sTTI transmission power can be reserved in accordance with capability of the terminal 200.

Embodiment 2

A base station and a terminal according to the present embodiment share a basic configuration with the base station 100 and the terminal 200 according to Embodiment 1 and are therefore described with reference to FIGS. 2 and 3.

In the present embodiment, a case where the terminal 200 determines whether or not transmission power is reserved for an sTTI on the basis of a priority of a UL signal is described in detail.

[Operation of Dual Connectivity]

In dual connectivity, transmission power can be distributed by determining priorities for UL transmission of an MCG and UL transmission of an SCG. Each cell group (CG) includes a single primary cell (PCell) or primary scell (PScell) and 0, 1, or a plurality of secondary cells (SCells). In dual connectivity, a random access channel (RACH) transmitted in the Pcell of the MCG is given a highest priority, and priorities are allocated to respective channels as follows:

RACH>HARQ-ACK=SR>CSI>PUSCH without UCI

In a case where the same channel is transmitted in the MCG and the SCG, UL transmission of the MCG is given a higher priority than UL transmission of the SCG.

The RACH is given a high priority because the RACH is information necessary for connection for communication or synchronous capture. The HARQ-ACK is given a high priority because there is a possibility that an error reception causes unnecessary HARQ retransmission of DL data or causes retransmission in an upper layer without HARQ retransmission even in a case where retransmission is necessary.

Furthermore, since it is predicted that a data amount in DL is larger than a data amount in UL, it is desirable that the HARQ-ACK (uplink response signal) is given a higher priority than UL data (physical uplink shared channel (PUSCH)) in order to prioritize DL data.

The PUSCH without UCI (Uplink Control Information) is given a low priority since UL data need just be retransmitted in a case where UL data reception quality deteriorates and influence on a system is not large.

In dual connectivity, there is no close cooperation between the MCG and the SCG, and an MCG bearer and an SCG bearer are different in some cases. In this case, the MCG and the SCG may be selected and used in accordance with priorities of applications or packets. Accordingly, an SR is separately transmitted in the MCG and the SCG, and therefore an SR and another UL signal are sometimes transmitted simultaneously even in a case where transmission power is tight. For this reason, the SR is given a high priority equal to the HARQ-ACK.

In the present disclosure, a method for distributing power among TTIs while regarding each TTI as a cell group in dual connectivity in a case where a plurality of TTI lengths are supported simultaneously is described. In a case where a UL signal of an sTTI and a UL signal of a TTI are simultaneously transmitted in the same component carrier (CG), a scheduler of a base station may use the sTTI or the TTI freely if transmission power is tight. In this case, in a case where a UE transmits an SR in an sTTI or a TTI, the base station performs scheduling of the UE so as to allocate data to an sTTI, an TTI, or both an sTTI and a TTI.

Such operation can prevent the UE from transmitting an SR simultaneously in an sTTI and a TTI. Furthermore, since the signals are transmitted simultaneously within the same CC, in a case where HARQ-ACK of a TTI or an sTTI and an SR occur simultaneously, the UE can transmit the HARQ-ACK and the SR simultaneously by changing a transmission position of a PUCCH or an sPUCCH used for transmission of the HARQ-ACK to a transmission position of the SR.

Furthermore, in a case where UL data is transmitted, the UE can transmit, instead of the SR, a buffer status report (BSR) reporting a buffer state of the UE as MAC layer information in an sPUSCH of an sTTI or a PUSCH of a TTI.

The UE transmits information on the SR by selecting a method that can keep quality of the SR on the basis of transmission power allocated to each channel among these methods. However, in a case where quality of the SR cannot be kept by any of the methods since transmission power is tight because of simultaneous transmission of a UL signal of an sTTI and a UL signal of a TTI, the UE transmits the SR in a later subframe. This prevents the UE from transmitting a low-quality SR, thereby improving reliability of the SR. Furthermore, it is possible to keep quality of other channels from decreasing due to interruption of an SR.

As described above, a priority of the SR can be made lower than a priority of the HARQ-ACK in the case of simultaneous transmission of an sTTI and a TTI. Priorities of the UL channels in this case can be set as follows:

RACH>HARQ-ACK>SR>CSI>PUSCH without UCI

The CSI is a report of line quality. In dual connectivity, the CSI is given a higher priority than the PUSCH without UCI. However, in a case where a UL signal of an sTTI and a UL signal of a TTI are simultaneously transmitted in the same CC, the CSI can be shared by the sTTI and the TTI. The sTTI can increase frequency of transmission of the CSI since the number of TTIs per time becomes larger. This allows a base station to make modification by using CSI transmitted next even in a case where the base station cannot correctly receive CSI.

In view of this, a priority of the UL data (PUSCH) can be made higher than a priority of the CSI.

In this case priorities of the UL channels can be set as follows:

RACH>HARQ-ACK>SR>PUSCH with
CSI>PUSCH without UCI>CSI on PUCCH

In a case where a UL signal of an sTTI and a UL signal of a TTI are simultaneously transmitted in the same CC, influence on the TTI is larger if retransmission occurs due to deterioration of line quality. This is because a resource used for retransmission in the TTI is larger than that in the sTTI.

In view of this, a TTI may be prioritized in simultaneous transmission of an sTTI and a TTI. Furthermore, in a case where an sTTI is being used but is switched to a TTI due to deterioration of a line quality situation, it is preferable that the TTI is prioritized. However, it is preferable that an sTTI is prioritized in a case where a packet for which low delay is requested (a packet for which a delay time should be shortened) is transmitted in an sTTI and a packet for which delay is permitted is transmitted in a TTI.

Priorities of respective TTI lengths of a plurality of TT's having different TTI lengths may be determined in advance in a system or a base station may notify a terminal about a TTI having a TTI length that is prioritized.

It is also possible to set priorities in accordance with kinds of channels and then set, for each channel, which of a TTI and an sTTI is prioritized in a case of channels of the same kind.

Operation Example

Priorities of UL channels are set as follows:

RACH>HARQ-ACK>SR>PUSCH with
CSI>PUSCH without UCI>CSI on PUCCH

In a case where a priority of a UL signal of an sTTI transmitted within a long TTI is higher than a priority of a UL signal of the long TTI, the terminal 200 (transmission power determination unit 211) reserves desired transmission power for the UL signal of the sTTI within the long TTI (e.g., a subframe).

In a case where a priority of a UL signal of a long TTI is identical to a priority of a UL signal of an sTTI (i.e., in a case of channels of the same kind), the terminal 200 preferentially allocates desired transmission power for the UL signal of the long TTI within the long TTI (subframe).

The following describes operation of the terminal 200 in this operation example.

(1) Case where ACK/NACK (HARQ-ACK) is Allocated to sTTI

The terminal 200 allocates transmission power preferentially to ACK/NACK transmitted in an sPUCCH or an sPUSCH of an sTTI over a PUSCH with CSI, a PUSCH without UCI, or CSI transmitted on a PUCCH of a TTI. For example, according to the operation of Embodiment 1, the terminal 200 reserves transmission power for an sTTI in a case where DCI indicative of allocation of an sPDSCH can be received before a subframe boundary. Meanwhile, the terminal 200 allocates transmission power preferentially to a UL signal of a TTI in a case where an RACH or ACK/NACK is allocated to the TTI (i.e., in a case of channels of the same kind).

(2) Case where sPUSCH with CSI is Allocated to sTTI

The terminal 200 allocates transmission power preferentially to an sPUSCH with CSI of an sTTI over a PUSCH without UCI or CSi transmitted on a PUCCH of a TTI. For example, according to the operation of Embodiment 1, the terminal 200 reserves transmission power for an sTTI in a case where DCI indicative of allocation of an sPUSCH can be received before a subframe boundary.

Meanwhile, in a case where an RACH, ACK/NACK, or a PUSCH with CSI is allocated to a TTI, the terminal 200 allocates transmission power preferentially to a UL signal of the TTI.

(3) Case where sPUSCH without CSI is Allocated to sTTI

The terminal 200 allocates transmission power preferentially to an sPUSCH without CSI over CSI transmitted on a PUCCH of a TTI. For example, according to the operation of Embodiment 1, the terminal 200 reserves transmission power for an sTTI in a case where DCI indicative of allocation of the sPUSCH can be received before a subframe boundary. Meanwhile, the terminal 200 allocates transmission power preferentially to a UL signal of a TTI in a case where an RACH, ACK/NACK, a PUSCH with CSI, or a PUSCH without CSI is allocated to a TTI.

As described above, according to the present embodiment, the terminal 200 determines whether or not to reserve transmission power for an sTTI in accordance with priorities of UL signals (UL channels). That is, the terminal 200 reserves transmission power for transmission of an sTTI channel in a case where a priority of the sTTI channel is higher than a priority of a long TTI. This makes it possible to reserve sufficient transmission power for a UL signal of an sTTI given a high priority even during transmission of a UL signal of a long TTI. According to the present embodiment, it is therefore possible to properly set distribution of transmission power in a case where TTI lengths are different.

The embodiments of the present disclosure have been described above.

In the above embodiments, a case where a long TTI that is a subframe of LTE and a short TTI that is an sTTI considered in LTE-Advanced are used as an example of a plurality of TTIs having different TTI lengths has been described. However, a plurality of TTIs having different TTI lengths are not limited to these and may be, for example, TTIs that use a long TTI and an sTTI in different RATs. The RAT is, for example, enhanced mobile broadband (eMBB), which is high-capacity communication, ultra-reliable and low latency communications (URLLC), or massive machine-type communications (mMTC), which is inter-terminal communication. LTE and LTE-Advanced can also be regarded as examples of the RAT. Since suitable TTI lengths for respective RATs are different, a TTI length can vary from one RAT to another. Furthermore, TTI lengths can be different in a plurality of systems in an RAT. Furthermore, an interval of 1 msec is referred to as a subframe in the above embodiments but is not limited to this. In a different RAT, a different name can be used as a 1-msec interval that serves as a standard.

In the above embodiments, physically, a long TTI and an sTTI may be allocated to the same component carrier or may be allocated to different component carriers.

A system that uses a long TTI may be a system in which a sub-carrier interval is narrow and a symbol interval is wide, and a system that uses a short TTI (sTTI) may be a system in which a sub-carrier interval is wide and a symbol interval is short. In LTE and LTE-Advanced, 1 msec is divided into 14 symbols in a case of a 15-KHz sub-carrier interval and Normal CP. For example, in a case where a sub-carrier interval is 60 kHz, a symbol length can be set short. This increases the number of symbols per msec. In this case, it is also easy to set a TTI length short. Therefore, the above embodiments can be applied to a terminal that uses a long TTI in a case where a sub-carrier interval is short and uses a short TTI in a case where a sub-carrier interval is wide and that transmits signals simultaneously in a long TTI and a short TTI.

Although a case where a TTI (long TTI) is 1 ms has been described in the above embodiments, a TTI length is not limited to this, and the above embodiments can be applied in a case where UL signals are transmitted simultaneously by using TT's having different TTI lengths.

Although an example in which an aspect of the present disclosure is realized by hardware has been described in the above embodiments, the present disclosure may be realized by software in cooperation with hardware.

Each functional block used in the description of the above embodiments is typically an LSI that is an integrated circuit having an input terminal and an output terminal. The integrated circuit may control each functional block used in the description of the above embodiments and include an input terminal and an output terminal. The functional blocks may be individually realized as one chip or some or all of the functional blocks may be integrated into one chip. The name used here is LSI, but it may also be called IC, system LSI, super LSI, or ultra LSI depending on the degree of integration.

A method for integration is not limited to LSI, and a dedicated circuit or a general-purpose processor may be used. A field programmable gate array (FPGA) that can be programmed after manufacturing an LSI or a reconfigurable logic device that allows reconfiguration of the connection or setup of circuit cells inside the LSI can be used.

Furthermore, if an integration technique that replaces LSI appears as a result of progress of a semiconductor technology or appearance of another derivative technology, functional blocks may be integrated by using the technique. One possibility is, for example, application of a biotechnology.

A terminal according to the present disclosure includes a receiving unit that receives downlink control information indicative of allocation of an uplink signal of a first transmission time interval (TTI) or an uplink signal of a second TTI having a shorter TTI length than the first TTI; a transmission power determination unit that determines transmission power of the uplink signal of the first TTI and transmission power of the uplink signal of the second TTI; and a transmitting unit that transmits the uplink signal of the first TTI and the uplink signal of the second TTI by using the determined transmission power on a basis of the downlink control information, wherein the transmission power determination unit reserves desired transmission power for the uplink signal of the second TTI in the first TTI in a case where decoding of the downlink control information indicative of allocation of the uplink signal of the second TTI to be transmitted within the first TTI is completed before start of transmission of the uplink signal of the first TTI.

The terminal according to the present disclosure is arranged such that the transmission power determination unit determines whether or not to reserve transmission power for the uplink signal of the second TTI on a basis of a value of Timing Advance (TA).

The terminal according to the present disclosure is arranged such that in a case where transmission of a plurality of uplink signals of the second TTI occurs within the first TTI, the transmission power determination unit allocates transmission power for the plurality of uplink signals of the second TTI on a basis of a signal for which the desired transmission power is highest among the plurality of uplink signals of the second TTI.

The terminal according to the present disclosure is arranged such that the transmission power determination unit allocates the transmission power reserved for the uplink signal of the second TTI to another uplink signal of the second TTI that occurs within the first TTI.

The terminal according to the present disclosure is arranged such that another uplink signal of the second TTI is a scheduling request (SR).

A terminal according to the present disclosure includes a receiving unit that receives downlink control information indicative of allocation of an uplink signal of a first transmission time interval (TTI) or an uplink signal of a second TTI having a shorter TTI length than the first TTI; a transmission power determination unit that determines transmission power of the uplink signal of the first TTI and transmission power of the uplink signal of the second TTI; and a transmitting unit that transmits the uplink signal of the first TTI and the uplink signal of the second TTI by using the determined transmission power on a basis of the downlink control information, wherein the transmission power determination unit reserves desired transmission power for the uplink signal of the second TTI in the first TTI in a case where a priority of the uplink signal of the second TTI to be transmitted within the first TTI is higher than a priority of the uplink signal of the first TTI.

The terminal according to the present disclosure is arranged such that in a case where the priority of the uplink signal of the first TTI and the priority of the uplink signal of the second TTI are identical, the transmission power determination unit preferentially allocates desired transmission power to the uplink signal of the first TTI within the first TTI.

A communication method according to the present disclosure includes receiving downlink control information indicative of allocation of an uplink signal of a first transmission time interval (TTI) or an uplink signal of a second TTI having a shorter TTI length than the first TTI; determining transmission power of the uplink signal of the first TTI and transmission power of the uplink signal of the second TTI; and transmitting the uplink signal of the first TTI and the uplink signal of the second TTI by using the determined transmission power on a basis of the downlink control information, wherein desired transmission power for the uplink signal of the second TTI in the first TTI is reserved in a case where decoding of the downlink control information indicative of allocation of the uplink signal of the second TTI to be transmitted within the first TTI is completed before start of transmission of the uplink signal of the first TTI.

A communication method according to the present disclosure includes receiving downlink control information indicative of allocation of an uplink signal of a first transmission time interval (TTI) or an uplink signal of a second TTI having a shorter TTI length than the first TTI; determining transmission power of the uplink signal of the first TTI and transmission power of the uplink signal of the second TTI; and transmitting the uplink signal of the first TTI and the uplink signal of the second TTI by using the determined transmission power on a basis of the downlink control information, wherein desired transmission power for the uplink signal of the second TTI in the first TTI is reserved in a case where a priority of the uplink signal of the second TTI to be transmitted within the first TTI is higher than a priority of the uplink signal of the first TTI.

INDUSTRIAL APPLICABILITY

An aspect of the present disclosure is useful for a mobile communication system.

REFERENCE SIGNS LIST

100 base station
101 DCI generating unit
102, 208 error correction encoding unit
103, 209 modulating unit
104, 210 signal allocating unit
105, 212 transmitting unit
106, 201 receiving unit
107, 202 signal separating unit
108 ACK/NACK receiving unit
109, 203 demodulating unit
110, 204 error correction decoding unit
200 terminal
205 error determining unit
206 ACK/NACK generating unit
207 DCI receiving unit
211 transmission power determination unit

The invention claimed is:

1. A terminal comprising:
    circuitry, which, in operation, determines a first transmission power of a first uplink signal for a first transmission time interval of a first radio access technology (RAT) and a second transmission power of a second uplink signal for a second transmission time interval of a second RAT, the first transmission time interval being longer than the second transmission time interval; and
    a transmitter, which, in operation, transmits the first uplink signal in the first transmission time interval with the first transmission power, and transmits the second uplink signal in the second transmission time interval with the second transmission power,
    wherein the circuitry, in operation, determines the first transmission power for the first uplink signal and the second transmission power for the second uplink signal by reserving the first transmission power for the first uplink signal, the first transmission time interval is one subframe, the second transmission time interval is shorter than one subframe, the first RAT is a long term evolution (LTE), and the second RAT is a new RAT.

2. The terminal according to claim 1, wherein the circuitry, in operation, priorities the first transmission power for the first uplink signal over the second transmission power for the second uplink signal.

3. The terminal according to claim 1, wherein the circuitry, in operation, reserves the first transmission power for the first uplink signal in a case where the first uplink signal is prioritized over the second uplink signal.

4. The terminal according to claim 1, wherein the second transmission time interval is within the first transmission time interval.

5. The terminal according to claim 1, wherein a subcarrier spacing in the first RAT is narrower than a subcarrier spacing in the second RAT.

6. The terminal according to claim 1, wherein a subcarrier spacing in the first RAT is 15 kHz, and a subcarrier spacing in the second RAT is 60 kHz.

7. A communication method comprising:
    determining a first transmission power of a first uplink signal for a first transmission time interval of a first radio access technology (RAT) and a second transmission power of a second uplink signal for a second transmission time interval of a second RAT, the first transmission time interval being longer than the second transmission time interval; and
    transmitting the first uplink signal in the first transmission time interval with the first transmission power, and transmits the second uplink signal in the second transmission time interval with the second transmission power,
    wherein the first transmission power for the first uplink signal and the second transmission power for the second uplink signal are determined by reserving the first transmission power for the first uplink signal, the first transmission time interval is one subframe, the second transmission time interval is shorter than one subframe, the first RAT is a long term evolution (LTE), and the second RAT is a new RAT.

8. The communication method according to claim 7, wherein the first transmission power for the first uplink signal is prioritized over the second transmission power for the second uplink signal.

9. The communication method according to claim 7, wherein the first transmission power for the first uplink signal is reserved in a case where the first uplink signal is prioritized over the second uplink signal.

10. The communication method according to claim 7, wherein the second transmission time interval is within the first transmission time interval.

11. The communication method according to claim 7, wherein a subcarrier spacing in the first RAT is narrower than a subcarrier spacing in the second RAT.

12. The communication method according to claim 7, wherein a subcarrier spacing in the first RAT is 15 kHz, and a subcarrier spacing in the second RAT is 60 kHz.

* * * * *